United States Patent [19]
Prior et al.

[11] Patent Number: 6,085,519
[45] Date of Patent: Jul. 11, 2000

[54] ANTI-COKING AIR INJECTION APPARATUS FOR AN INTERNAL COMBUSTION ENGINE

[75] Inventors: Gregory Paul Prior, Birmingham; David C. Shaw, Southgate, both of Mich.

[73] Assignee: General Motors Corporation, Detroit, Mich.

[21] Appl. No.: 09/197,985

[22] Filed: Nov. 23, 1998

[51] Int. Cl.$^7$ ...................................................... F01N 3/10
[52] U.S. Cl. .............................. 60/304; 60/293; 60/275; 60/307; 123/549; 123/556
[58] Field of Search ............................ 60/304, 303, 301, 60/275, 286, 276, 292, 293, 306, 307; 123/549, 550, 556, 555, 26

[56] References Cited

U.S. PATENT DOCUMENTS

| | | | |
|---|---|---|---|
| 3,791,144 | 2/1974 | Lang | 60/278 |
| 4,539,812 | 9/1985 | Rezy | 60/304 |
| 4,558,670 | 12/1985 | Trihey | 123/308 |
| 4,768,481 | 9/1988 | Wood | 123/254 |
| 5,406,788 | 4/1995 | Dambach et al. | 60/276 |
| 5,862,786 | 1/1999 | Fuchs et al. | 123/142.5 |

*Primary Examiner*—Thomas Denion
*Assistant Examiner*—Binh Tran
*Attorney, Agent, or Firm*—Michael J. Bridges

[57] ABSTRACT

An improved anti-coking air injection reaction system in which individual air passages in the engine cylinder head are provided with electrical resistance heating elements that are periodically activated to develop radiant energy that bums off coke deposits formed on the passage side-walls. The heating elements are conveniently implemented with conventional glow plugs. A controller monitors engine operating parameters to identify conditions likely to result in the formation of coke deposits, and schedules activation of the heating elements in relation to the frequency of the identified conditions or the cumulative time of engine operation. The heating elements may be activated sequentially or in banks to reduce electrical loading, and the activation is preferably scheduled during non-critical operating conditions defined by specified ranges of coolant temperature and engine speed and/or load. Due to the cleansing action of the heating elements, the auxiliary air passages remain substantially deposit-free, resulting in the attainment of the intended emission reduction without requiring periodic engine servicing to clean out the air passages. Additionally, the air passages may be sized for ease of packaging and/or optimum air distribution, improving the efficiency and efficacy of the system.

10 Claims, 3 Drawing Sheets

6,085,519

ANTI-COKING AIR INJECTION APPARATUS FOR AN INTERNAL COMBUSTION ENGINE

TECHNICAL FIELD

This invention relates to apparatus for injecting auxiliary air into the exhaust stream of an internal combustion engine to reduce hydrocarbon emissions, and more particularly to an apparatus that eliminates build-up of carbon deposits in air injection passages.

BACKGROUND OF THE INVENTION

A known expedient for reducing hydrocarbon emissions in internal combustion engines involves the injection of outside, or auxiliary, air in the vicinity of the cylinder exhaust ports. This technique is sometimes referred to as Air Injection Reaction, or simply AIR. The auxiliary air is supplied by an engine-driven or electric motor-driven pump, and distributed to the various exhaust passages of a given cylinder bank by a series of passages formed in the respective cylinder head.

A problem that may occur in AIR systems is that exhaust gas reaction occurring in the AIR passages could result in an accumulation of carbonized particulate matter, or coke, on the walls of the passages. Over time, the coke deposits may build up, eventually restricting or even closing off the passages, thereby degrading or eliminating the intended emission reductions. Although the degradation can be reduced by providing over-sized AIR passages, the larger passages are difficult to package in the cylinder head, and tend to cause imbalance in air distribution among the various passages.

SUMMARY OF THE INVENTION

The present invention is directed to an improved anti-coking AIR system in which individual air passages in the engine cylinder head are provided with electrical resistance heating elements that are periodically activated to produce radiant energy that burns off coke deposits formed on the passage side-walls.

In a mechanization of the invention, the heating function was carried out with conventional glow plugs, commonly used as a combustion aid in starting diesel engines. Preferably, the invention includes a controller for monitoring engine operating parameters to identify conditions likely to result in the formation of coke deposits, and for scheduling activation of the heating elements in relation to the frequency of the identified conditions or the cumulative time of engine operation. The heating elements may be activated sequentially or in banks to reduce electrical loading, and the activation is preferably scheduled during non-critical operating conditions defined by specified ranges of coolant temperature and engine speed and/or load.

Due to the cleansing action of the heating elements, the auxiliary air passages remain substantially deposit-free, resulting in the attainment of the intended emission reduction without requiring periodic engine servicing to clean out the air passages. Additionally, the air passages may be sized for ease of packaging and/or optimum air distribution, improving the efficiency and efficacy of the system.

DESCRIPTION OF THE PREFERRED EMBODIMENT

Figure 1:
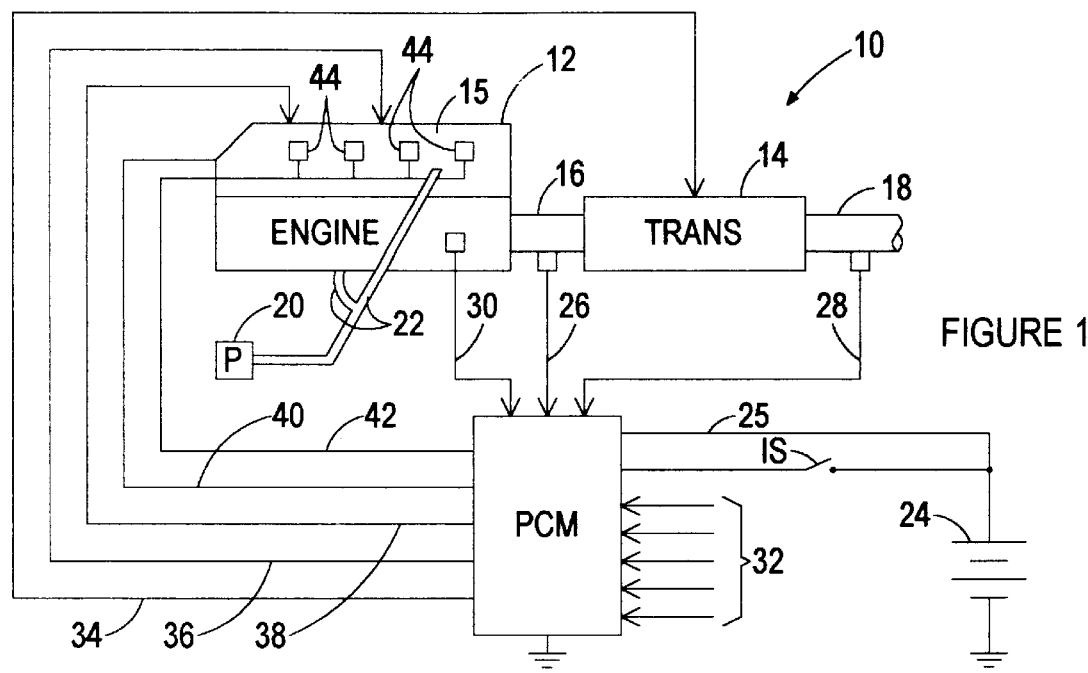
FIG. 1 is a schematic diagram of an internal combustion engine air injection reaction system including an electronic powertrain controller.

Referring to the drawings, and particularly to FIG. 1, the reference numeral 10 generally designates an automotive powertrain including an internal combustion engine 12 and an automatic transmission 14. In the illustrated embodiment, engine 12 is depicted as having a V-8 design, with two banks of four linearly arranged cylinders and a pair of cylinder heads 15, only one of which is depicted in FIG. 1. Engine 12 is coupled to transmission 14 via engine output shaft 16, and transmission 14 couples powertrain 10 to a drive axle (not shown) via output shaft 18. An air injection reaction (AIR) pump 20, which may be driven by engine 12 or by an electric motor (not shown), provides auxiliary air to the cylinder heads 15 via conduits 22 for reducing the engine hydrocarbon emissions.

Figure 2:
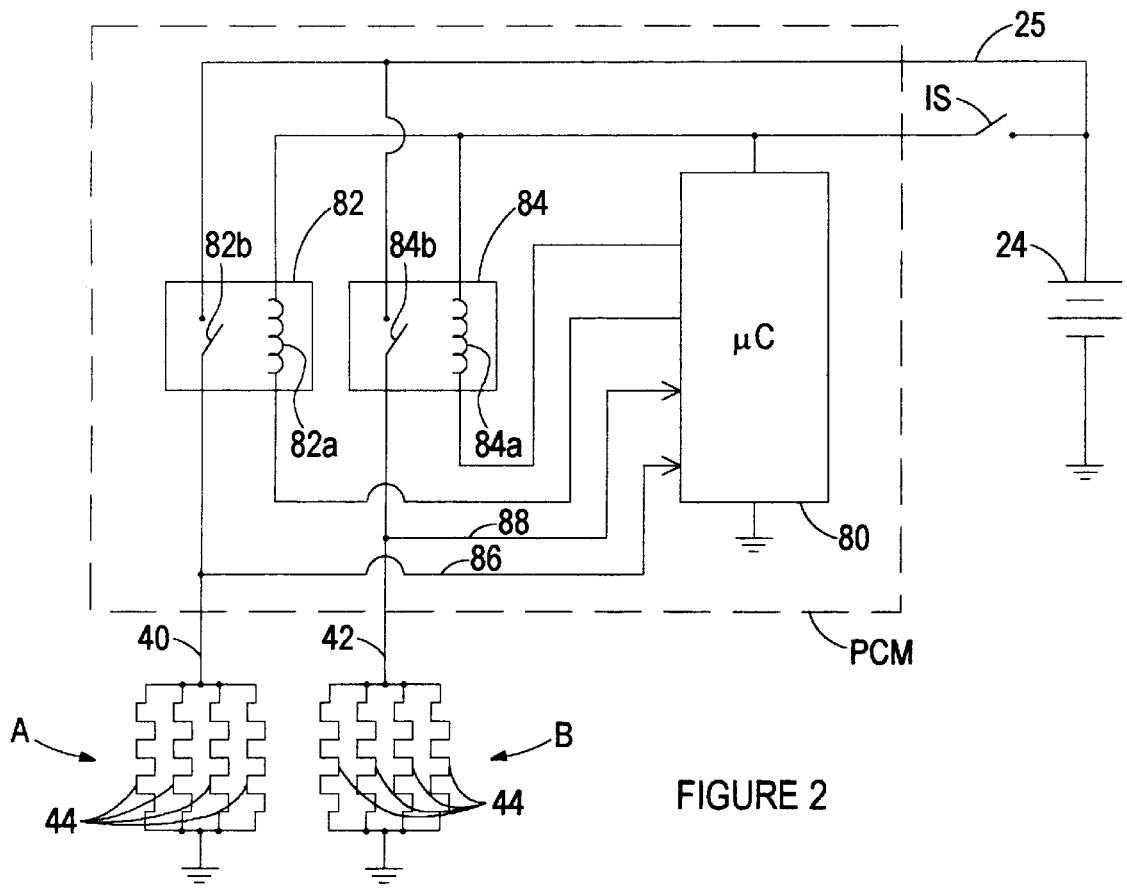
FIG. 2 is a schematic diagram of a portion of the powertrain controller of FIG. 1.

The operation of engine 12 and transmission 14 is controlled by a powertrain control module, designated in FIGS. 1–2 as PCM. The PCM is powered by a vehicle storage battery 24 and controls the operation of engine 12 and transmission 14 in accordance with predefined control algorithms based on various input signals provided thereto. The battery 24 is connected directly to the PCM via line 25, and indirectly via conventional ignition switch IS. The PCM input signals include, for example, engine and vehicle speed inputs on lines 26 and 28, an engine coolant temperature signal on line 30, and a variety of other signals as generally designated by the reference numeral 32. These may include engine mass air flow and temperature, a measure of electrical loading, and various driver inputs such as throttle position and gear selector position. The PCM outputs include a control signal on line 34 for effecting transmission shifting and line pressure, control signals on lines 36–38 for regulating engine spark and fuel control, and control signals on lines 40–42 for periodically activating a series of glow plugs 44 in accordance with this invention.

Figure 3:
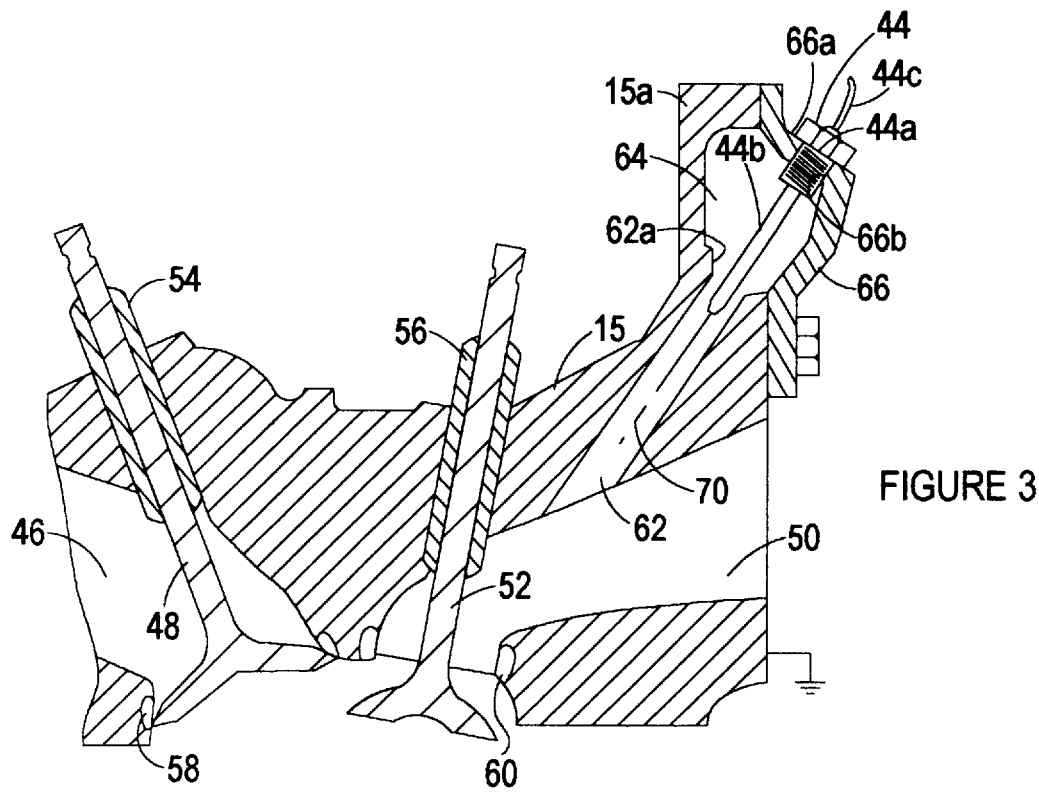
FIG. 3 is cross-sectional view of an engine cylinder head outfitted with AIR heating elements according to a first embodiment of this invention.

Referring specifically to FIG. 3, it will be seen that the cylinder heads define, for each cylinder, an intake passage 46 upstream of one or more intake valves 48, and an exhaust passage 50 downstream of one or more exhaust valves 52, the intake and exhaust valves 48, 52 being supported by valve guides 54, 56 pressed into suitable apertures in the cylinder head casting. The cylinder head 15 also defines hardened seats 58, 60 for each of the valves, and the valves are displaced in synchronism with engine rotation in a conventional manner. In FIG. 3, the intake valve 48 is depicted in the closed or seated position, while the exhaust valve 52 is depicted in the open or un-seated position. Finally, the cylinder heads 15 define a plurality of AIR passages 62 for delivering auxiliary air developed by AIR pump 20 to the various exhaust passages 50. The upstream ends of AIR passages 62 terminate in a closed plenum 64 defined by the cylinder head wall 15a and a plenum cover 66 which is bolted to the cylinder head 15. Thus, one of the conduits 22 supplies auxiliary air to the plenum 64 of the cylinder head 15 depicted in FIG. 1, and such air is distributed among four auxiliary air passages, referred to herein as AIR passages 62 to the various exhaust passages 50 just downstream of the respective exhaust valves 52. As indicated above, and as best seen in FIG. 3, the glow plugs 44 are mounted with respect to the AIR passages 62, formed in the engine cylinder heads 15 for eliminating coke deposits in such AIR passages.

Figure 4:
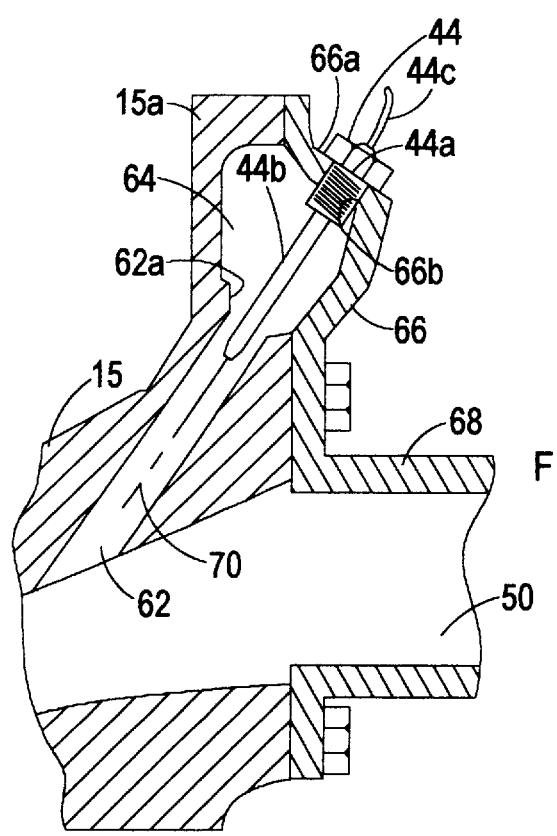
FIG. 4 is cross-sectional view of a portion of an engine cylinder head outfitted with AIR heating elements according to a second embodiment of this invention.

FIGS. 3 and 4 depict alternative plenum cover designs; in FIG. 3, the plenum cover 66 is a separate element, whereas in FIG. 4, the plenum cover 66 is integrated into an exhaust manifold 68. In either case, the plenum cover 66 includes a wall portion 66a perpendicular to the centerlines 70 of the AIR passages 62, the wall portion 66a having a series of tapped openings 66b in line with the centerline 70 of each AIR passage 62. Each tapped opening 66b receives a threaded base 44a of the glow plug 44. The glow plug has an elongate heating element 44b which extends into the respective AIR passage 62 as shown in FIGS. 3 and 4.

The length of the heating element 44b determines the extent to which its tip extends into the respective AIR passage 62, and the required length for effective anti-coking depends to some degree on the geometry of the AIR passage 62. In the illustrated embodiment for example, it has been found that coke deposits tend to form in the vicinity of chamfer 62a, or at any other surface irregularity of the passage 62. Accordingly, the heating element length for achieving optimum performance will vary somewhat depending on the air passage geometry. In any event, activation of the glow plugs 44 heats the elements 44b, producing sufficient radiant energy to burn off any coke deposits formed on the inner periphery of the respective AIR passages 62.

As indicated in reference to FIG. 1, the various glow plugs 44 are electrically coupled to the PCM via lines 40 and 42. In the illustrated embodiment, each line 40, 42 activates a bank of four parallel-connected glow plugs 44, one such bank for each cylinder head 15. Thus, the glow plug wires 44c associated with the glow plugs of a given cylinder head 15 are joined, and electrically coupled to a respective line 42 or 44. A common electrical ground connection for all of the glow plugs 44 is provided through the cylinder heads 15. This arrangement is schematically depicted in the lower portion of FIG. 2, where the two banks of glow plugs 44 are generally designated by the letters A and B.

Referring particularly to FIG. 2, the PCM includes a microcomputer (μC) 80 and a pair of relays 82 and 84. In practice, the relays 82–84 may be located remote from the PCM if desired. Each relay 82, 84 includes a coil 82a, 84a and a normnally-open contact 82b, 84b which is closed when the respective coil 82a, 84a is energized with electric current. The coils 82a, 84a are connected together at one end to battery 24 through ignition switch IS, and individually at the other ends to the microcomputer 80. The contacts 82b, 84b are connected together at one end to battery 24 via line 25, and individually at the other ends to respective glow plug control lines 40, 42. Thus, when it is desired to activate the glow plugs 44 of bank A, the microcomputer 80 grounds its end of relay coil 82a, thereby closing the contact 82b and applying battery voltage to bank A via control line 40. Similarly, when it is desired to activate the glow plugs 44 of bank B, the microcomputer 80 grounds its end of relay coil 84a, thereby closing the contact 84b and applying battery voltage to bank B via control line 42. The diagnostic lines 86 and 88 couple the control lines 40 and 42 to input ports of microcomputer 80 so that the microcomputer 80 can independently verify activation of the respective bank of glow plugs 44.

Figure 5:
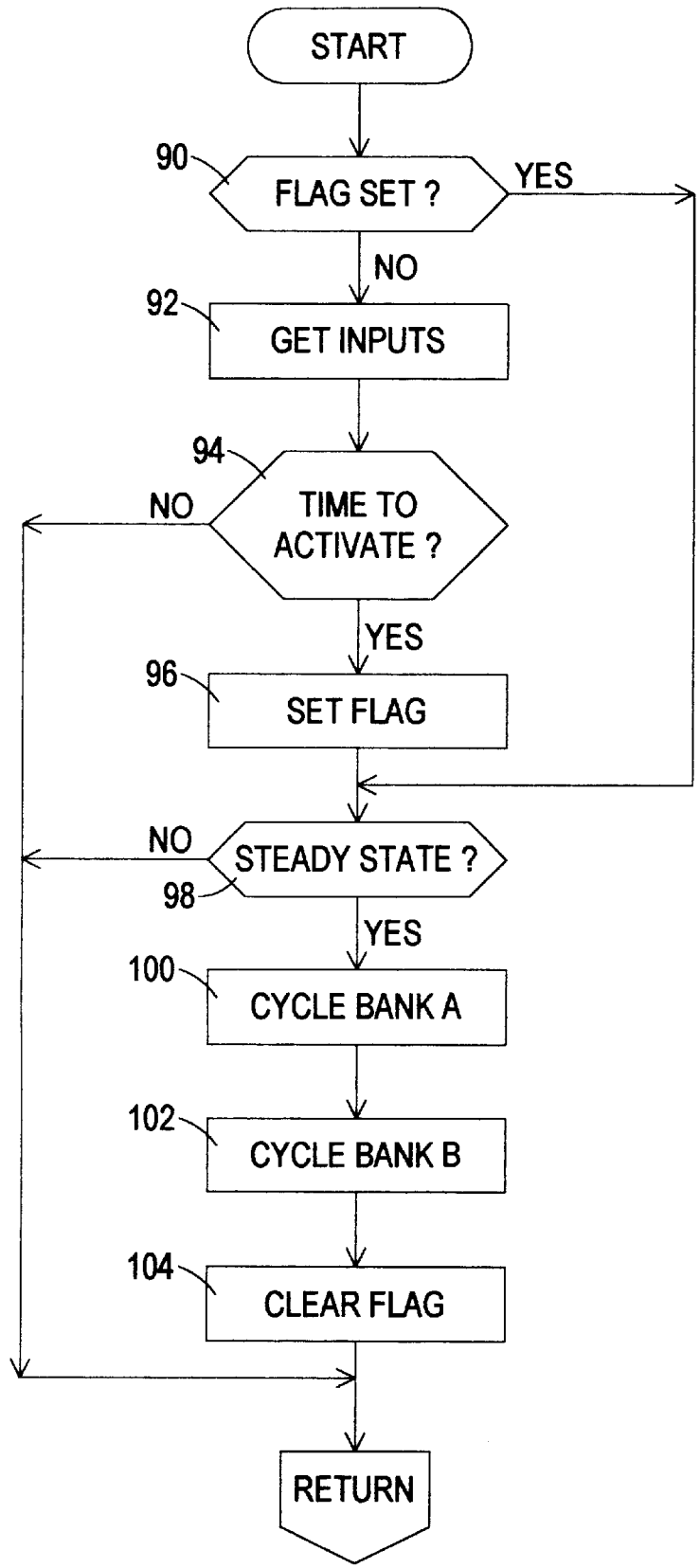
FIG. 5 is a flow diagram of a computer program routine executed by the powertrain controller of FIGS. 1–2 in carrying out a control according to this invention.

FIG. 5 is a flow diagram representative of computer program instructions carried out by the microcomputer 80 of FIG. 2 in carrying out a control of glow plugs 44. The flow diagram is illustrative in nature, and may be implemented as a periodically executed subroutine of a comprehensive software routine for controlling engine 12 and transmission 14. In the illustrated embodiment, a flag (FLAG) is used to signify that activation of the glow plugs is desired. Thus, at each execution of the routine, the block 90 is executed to determine if the FLAG is set. If the FLAG is set, the routine proceeds to block 98, described below. If not, blocks 92 and 94 are executed to get the various input signals used in the activation algorithms, and to determine if activation is desired. If the various algorithms determine that glow plug activation is desired, the block 96 is executed to set the FLAG; otherwise, the remainder of the routine is skipped.

The activation algorithms may be simple or sophisticated. For example, in a simple mechanization, the glow plugs 44 can be activated when predetermined mileage milestones have been reached (i.e., every 5000 miles), or at predetermined intervals of vehicle operation (i.e., after each 200 hours of engine operation). In a more sophisticated approach, the glow plugs 44 can be activated (or the mileage or hours of operation intervals may be adjusted) depending on other factors such as engine oil quality, average engine coolant temperature, or driving schedule. In this regard, it is generally known that coke formation is typically highest during relatively low engine operating temperatures.

If the FLAG is set, indicating that glow plug activation is desired, the block 98 is executed to determine if the engine is operating under steady state conditions, or if the vehicle operating conditions are such that the electrical loading associated with activation of the glow plugs 44 would not disturb other systems or be apparent to the vehicle occupants. Steady state operation may be determined based on the attainment of specified vehicle speed and engine load and temperature criteria, as is well known to those skilled in the art. Additionally, it may be desired to delay the glow plug activation if the electrical loading is already in excess of a reference value, or if the battery voltage is less than a reference value.

If block 98 is answered in the negative, the remainder of the routine is skipped, and activation of the glow plugs 44 is delayed until block 98 is answered in the affirmative. At such point, the blocks 100–104 are executed to sequentially cycle the glow plugs 44 of banks A and B, and then to clear the FLAG to indicate that the activation has been achieved. During such operation, the diagnostic information provided on lines 86 and 88 of FIG. 2 may be used to verify that activation has properly occurred. Preferably, individual glow plug banks A and B are cycled on and off for a predefined activation interval; in a representative mechanization, the active bank is cycled on for 10 seconds and off for 30 seconds for an activation interval of 10 minutes. It will be recognized, however, that the activation parameters in any given mechanization will vary, depending, for example, on the glow plug specifications, the frequency of activation, and the cylinder head geometry.

In summary, the present invention contributes to an improved AIR system in which reasonably small AIR passages 62 remain substantially deposit free over the life of the vehicle, providing the consistent and efficacious reduction of engine hydrocarbon emissions. This system avoids packaging problems associated with over-sized AIR passages, and reduces or eliminates servicing to clean clogged AIR passages. While the invention has been described in reference to the illustrated embodiment, it is expected that various modifications in addition to those suggested above will occur to those skilled in the art. In this regard, it will be understood that the scope of this invention is not limited to the illustrated embodiment, and that systems incorporating such modifications may fall within the scope of this invention, which is defined by the appended claims.

What is claimed is:

1. Apparatus for injecting auxiliary air in an exhaust passage of an internal combustion engine of a motor vehicle for reducing engine hydrocarbon emissions, comprising:

a source of compressed air;

a plenum formed by at least one component of said engine, said source of compressed air being coupled to supply compressed air to said plenum;

an auxiliary air passage formed in a wall of said component, said air passage having a first opening in said plenum and a second opening in said exhaust passage;

an electric heating device mounted on said engine and having an elongate heating element extending through said plenum and into said auxiliary air passage; and a controller for electrically activating said heating device so that said heating element emits radiant energy for burning off combustion deposits formed on an inner periphery of said auxiliary air passage.

2. The apparatus of claim 1, wherein said at least one component is an engine cylinder head defining said exhaust passage.

3. The apparatus of claim 1, wherein said at least one component is an engine cylinder head, said plenum is formed by a wall of said cylinder head and a cover fastened to said cylinder head, said heating device being mounted on a portion of said cover that is perpendicular to a centerline of said auxiliary air passage.

4. The apparatus of claim 3, wherein said cover is integral with an exhaust manifold that is fastened to said cylinder head.

5. The apparatus of claim 1, wherein said heating device is a glow plug.

6. The apparatus of claim 1, wherein said controller includes a microcomputer responsive to detected operating conditions of said motor vehicle for determining when said heating device should be activated and for activating said heating device only during specified operating conditions of said motor vehicle.

7. The apparatus of claim 6, wherein said controller only activates said heating device when said microcomputer determines that said heating device should be activated and that said motor vehicle is operating in a steady state condition.

8. The apparatus of claim 6, wherein said controller activates said heating device by supplying electric current to said heating device in a cyclic on/off pattern for a predetermined interval.

9. Apparatus for injecting auxiliary air in a plurality of exhaust passages of a motor vehicle internal combustion engine for reducing engine hydrocarbon emissions, comprising:

a source of compressed air;

a plenum formed by at least one component of said engine, said source of compressed air being coupled to supply compressed air to said plenum;

a plurality of auxiliary air passages formed in a wall of said component, each such air passage having a first opening in said plenum and a second opening in a respective one of said exhaust passages;

a plurality of electric heating devices mounted on said engine, each having an elongate heating element extending through said plenum and into a respective one of said plurality of auxiliary air passages; and a controller for electrically activating said heating devices so that said heating elements emit radiant energy for burning off combustion deposits formed on inner peripheral surfaces of said auxiliary air passages.

10. The apparatus of claim 9, wherein said heating devices are divided into multiple groups of heating devices, and said controller alternately activates such groups of heating devices.

* * * * *